United States Patent
Pribush et al.

(10) Patent No.: US 6,697,933 B1
(45) Date of Patent: Feb. 24, 2004

(54) METHOD AND APPARATUS FOR FAST, SPECULATIVE FLOATING POINT REGISTER RENAMING

(75) Inventors: Gregory Pribush, Beer Sheva (IL); Ronny Ronen, Haifa (IL); Bishara Shomar, Nazareth (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/539,221

(22) Filed: Mar. 30, 2000

(51) Int. Cl.[7] ............................................. G06F 9/30
(52) U.S. Cl. ........................................................ 712/217
(58) Field of Search ................................. 712/217, 216

(56) References Cited

U.S. PATENT DOCUMENTS

| | | | | |
|---|---|---|---|---|
| 5,909,566 A | * | 6/1999 | Cai et al. ..................... | 712/207 |
| 5,974,524 A | * | 10/1999 | Cheong et al. ............... | 712/23 |
| 6,119,223 A | * | 9/2000 | Witt ............................. | 712/244 |
| 6,490,607 B1 | * | 12/2002 | Oberman ...................... | 708/620 |

* cited by examiner

*Primary Examiner*—Eddie Chan
*Assistant Examiner*—Charles Harkness
(74) *Attorney, Agent, or Firm*—Blakely, Sokoloff, Taylor & Zafman LLP (57) ABSTRACT

According to one aspect of the invention, a method is provided in which a current instance of an instruction is received. The current instance of the instruction contains a reference to a logical floating point register. A first rename phase is performed to convert the current's instance reference to the logical floating point register into a reference to an absolute register. A second rename phase is performed in parallel with the first rename phase to convert the reference to the absolute register into a reference to a physical register, based upon results obtained from performing the first rename phase with respect to a previous instance of the instruction.

24 Claims, 7 Drawing Sheets

| # | Code | Stack Details | FP TOS Before Instruct. | FP TOS After Instruct. | Absolute Register Mapping (1st renaming phase) | Physical Register Mapping (2nd renaming phase) |
|---|---|---|---|---|---|---|
| 1 | fld mem1 | push, st0 <= mem1 | fp0 | fp7 | fp7 = mem1 | pr7 = mem1 |
| 2 | fld mem2 | push, st0 <= mem2 | fp7 | fp6 | fp6 = mem2 | pr6 = mem2 |
| 3 | fld mem3 | push, st0 <= mem3 | fp6 | fp5 | fp5 = mem3 | pr5 = mem3 |
| 4 | faddpst1 | st0 <= st0 + st1 | fp5 | fp5 | fp5 = fp5 + fp6 | pr8 = pr5 + pr6 |
| 5 | fmulpst2 | st0 <= st0 * st2 | fp5 | fp6 | fp5 = fp5 * fp7 | pr9 = pr8 * pr7 |
| 6 | fstp mem4 | mem4 <= st0,pop | fp5 | fp6 | mem4 = fp5 | mem4 = pr9 |
| 7 | fpop | pop | fp6 | fp7 | | |
| 8 | fpop | pop | fp7 | fp0 | | |

METHOD AND APPARATUS FOR FAST, SPECULATIVE FLOATING POINT REGISTER RENAMING

FIELD OF THE INVENTION

The present invention relates generally to the field of processor technology. More specifically, the present invention relates to a method and apparatus for fast, speculative floating point register renaming.

BACKGROUND OF THE INVENTION

Processors typically execute instructions by reading the source operands of the instructions from various registers and storing the destination operands or results of the executed instructions into various registers. Registers are used to provide temporary storage area within a processor for storing arithmetic and other data used by various units within the processor to perform their corresponding functions. Different registers may be used for different purposes or functions. For instance, some registers may be used for storing results from arithmetic operations, some registers may be used for storing status information via various flag bits, and other registers may be used for storing results from floating point operations, etc. Modern processors employ out of order execution in order to speed up processing time by executing multiple instructions concurrently. Out of order execution utilizes a technique or mechanism called register renaming to eliminate false dependencies between instructions that are caused by register reuse. Register renaming eliminates the false dependencies by converting references to external (also referred to as logic or architectural) registers into references to internal or physical registers. The basic register renaming mechanism or technique is well known and widely used in modem processors employing out of order execution.

Performing register renaming for the floating point registers in some processor architecture (e.g., the Intel IA 32 architecture) involves additional complexity. For example, the IA32 floating point registers are architecturally accessed as a register stack. Specifically, these floating point registers are referenced by a top of stack (TOS) pointer and are therefore stack relative. In other words, a floating point register is addressed by its location relative to the top of the floating point stack. This top of stack may change from instruction to instruction so it is not straight forward to determine whether two operations use the same architectural or logic register. Therefore, in order to rename a floating point register, the stack relative references are first converted into an absolute register references (referred to as the first renaming phase) and then the traditional renaming of architectural or logic register references into physical register references is performed (referred to as the second renaming phase). The current floating point register renaming is therefore performed sequentially in two phases which does not optimize the out of order execution employed in modem processors.

Figure 1:
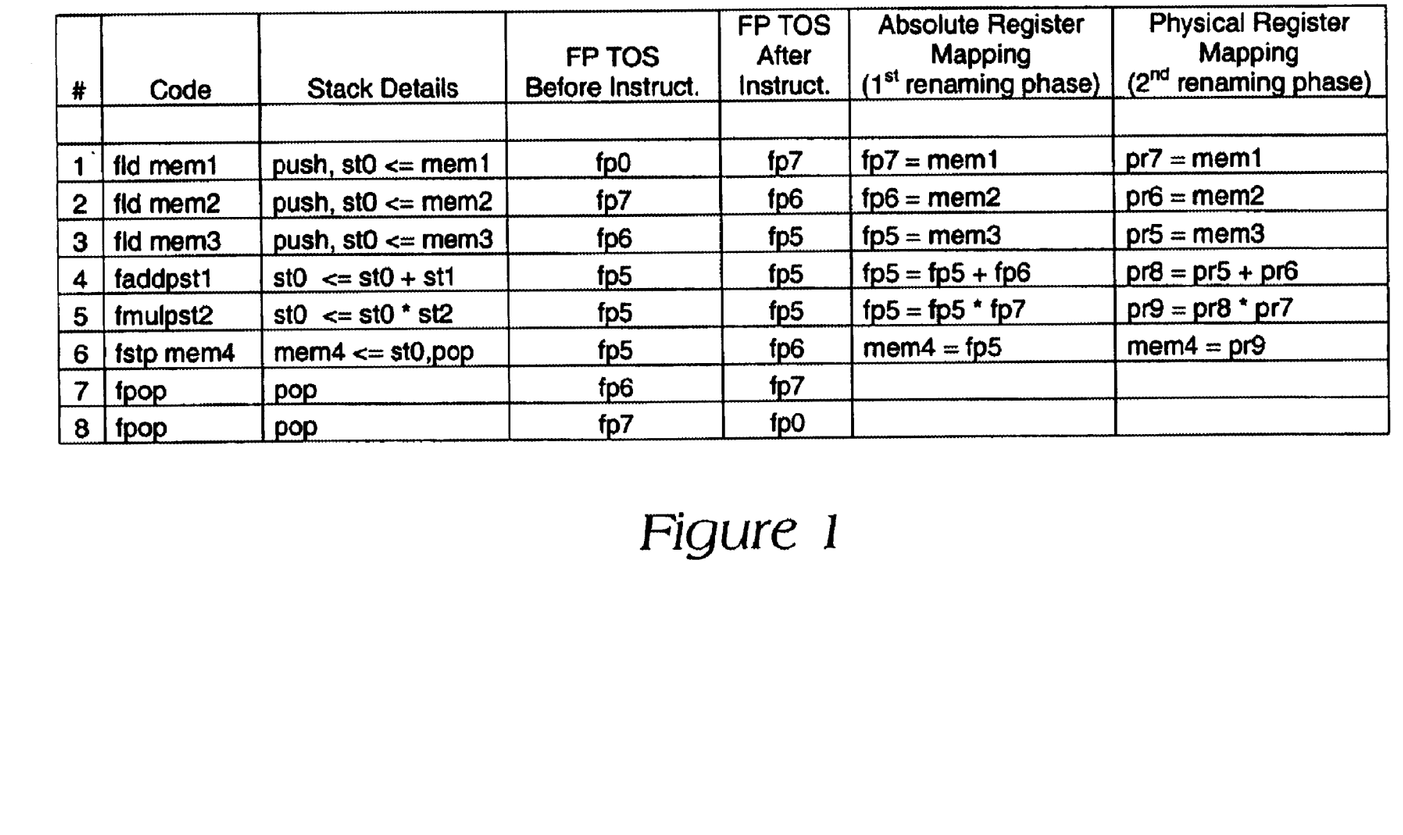
FIG. 1 shows an example illustrating a two-phase floating point register renaming.

FIG. 1 illustrates an example of a floating point register renaming mechanism in which the two renaming phases are performed sequentially to convert logic register references into absolute register references first and then convert absolute register references into physical register references. In this example, assuming that the following floating point computation is to be executed:

$$MEM4 = MEM1 * (MEM2 + MEM3)$$

As shown in FIG. 1, stn refers to a stack relative register number, fpn refers to an absolute register number, and prn refers to a physical register number. The instructions for this computation in this example are decoded into a number of micro-instructions (also called micro-operations or UOPs). These UOPs are executed with references to the floating point stack. As shown in FIG. 1, the TOS may change from one UOP to another UOP. FIG. 1 illustrates the two renaming phases that are performed in order to convert a reference to a logical floating point register into a reference to a physical floating point register. The two renaming phases are performed sequentially because the results obtained from the first renaming phase (i.e., the logical register to absolute register conversion) are used in the second renaming phase (i.e., the absolute register to physical register conversion). Performing the two renaming phases sequentially does not optimize the system performance because the second renaming phase has to wait for the completion of the first renaming phase. Thus the out of order execution architecture is not fully utilized with respect to the floating point register renaming function.

SUMMARY OF THE INVENTION

According to one aspect of the invention, a method is provided in which a current instance of an instruction is received. The current instance of the instruction contains a reference to a logical floating point register. A first rename phase is performed to convert the current's instance reference to the logical floating point register into a reference to an absolute register. A second rename phase is performed in parallel with the first rename phase to convert the reference to the absolute register into a reference to a physical register, based upon results obtained from performing the first rename phase with respect to a previous instance of the instruction.

BRIEF DESCRIPTION OF THE DRAWINGS

The features and advantages of the present invention will be more fully understood by reference to the accompanying drawings, in which.

DETAILED DESCRIPTION

In the following detailed description numerous specific details are set forth in order to provide a thorough understanding of the present invention. However, it will be appreciated by one skilled in the art that the present invention may be practiced without these specific details.

In the discussion below, the teachings of the present invention are utilized to implement a method, an apparatus, and a system for performing fast, speculative floating point register renaming in a processor employing out of order execution. Instead of performing the two phases of the floating point register renaming sequentially, the two phases are performed in parallel according to the teachings of the present invention. In one embodiment, a current instance of an instruction (e.g., a UOP) is received from another unit within a processor (e.g., a decoder which decodes a macro-instruction into one or more micro-instruction or micro-operations (UOPs)). The current instance of the instruction contains a reference to a logical (also called architectural or external) floating point register. In the first floating point rename phase, the current instance's reference to the logical floating point register is converted into a reference to an absolute register. In the second rename phase which is performed in parallel with the first rename phase, the reference to the absolute register is converted into a reference to a physical register based upon the results generated by the first rename phase with respect to a previous instance of the same instruction. In one embodiment, the results of the first rename phase with respect to the previous instance of the instruction is stored in a data structure to be used by the second rename phase with respect to the current instance of the instruction. Since the second rename phase is performed speculatively with respect to the current instance of the instruction based on the results of the first rename phase with respect to the previous instance of the instruction, the speculative results need to be validated. In one embodiment, to validate the results speculatively generated, a comparison is made to determine whether the results generated by the first rename phase with respect to the current instance match the results generated by the first rename phase with respect to the previous instance of the instruction. If the results do not match, the second rename phase is repeated with respect to the current instance using the results generated by the first rename phase with respect to the current instance. In one embodiment, if there is no record of previous instance of the instruction, a first instance case is performed. In one embodiment, a default value or predetermined value is supplied as the results of the first rename phase to be used by the second rename phase. Alternatively, a signal can be activated to indicate that there is no record of the previous instance of the instruction. In response to the signal being activated, the second rename phase is delayed until the first rename phase is completed. The teachings of the present invention are applicable to floating point register renamers in which a two-phase renaming is used to rename logical register references to physical register references. The teachings of the present invention are also applicable to any other scheme, method, or mechanism for register renaming in which more than one phase of renaming operations are performed to convert references to logical or external registers into references to physical or internal registers.

Figure 2:
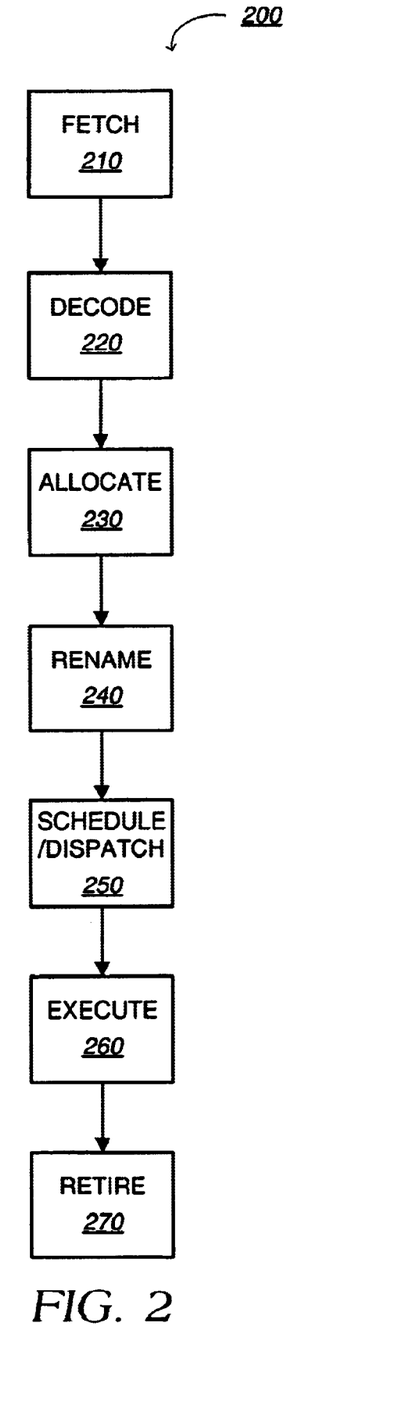
FIG. 2 is a block diagram of one embodiment of a processor pipeline in which the teachings of the present invention are implemented.

FIG. 2 is a block diagram of one embodiment of a processor pipeline 200 within which the present invention may be implemented. For the purposes of the present specification, the term "processor" refers to any machine that is capable of executing a sequence of instructions and shall be taken to include, but not be limited to, general purpose microprocessors, special purpose microprocessors, graphics controller, audio processors, video processors, multi-media controllers and microcontrollers. The processor pipeline 200 includes various processing stages beginning with a fetch stage 210. At this stage, instructions are retrieved and fed into the pipeline 200. For example, a macroinstruction may be retrieved from a cache memory that is integral within the processor or closely associated therewith, or may be retrieved from an external memory unit via a system bus. The instructions retrieved at the fetch stage 210 are then fed into a decode stage 220 where the instructions or macroinstructions are decoded into microinstructions or micro-operations for execution by the processor. At an allocate stage 230, processor resources necessary for the execution of the microinstructions are allocated. The next stage in the pipeline is a rename stage 240 where references to external registers are converted into internal register references to eliminate dependencies caused by register reuse. At a schedule/dispatch stage 250, each microinstruction is scheduled and dispatched to an execution unit. The microinstructions are then executed at an execute stage 260. After execution, the microinstructions are then retired at a retire stage 270.

In one embodiment, the various stages described above can be organized into three phases. The first phase can be referred to as an in-order front end including the fetch stage 210, decode stage 220, and allocate stage 230, and rename stage 240. During the in-order front end phase, the instructions proceed through the pipeline 200 in their original program order. The second phase can be referred to as the out-of-order execution phase including the schedule/dispatch stage 250 and the execute stage 260. During this phase, each instruction may be scheduled, dispatched and executed as soon as its data dependencies are resolved and the appropriate execution unit is available, regardless of its sequential position in the original program. The third phase, referred to as the in-order retirement phase which includes the retire stage 270 in which instructions are retired in their original, sequential program order to preserve the integrity and semantics of the program.

Figure 3:
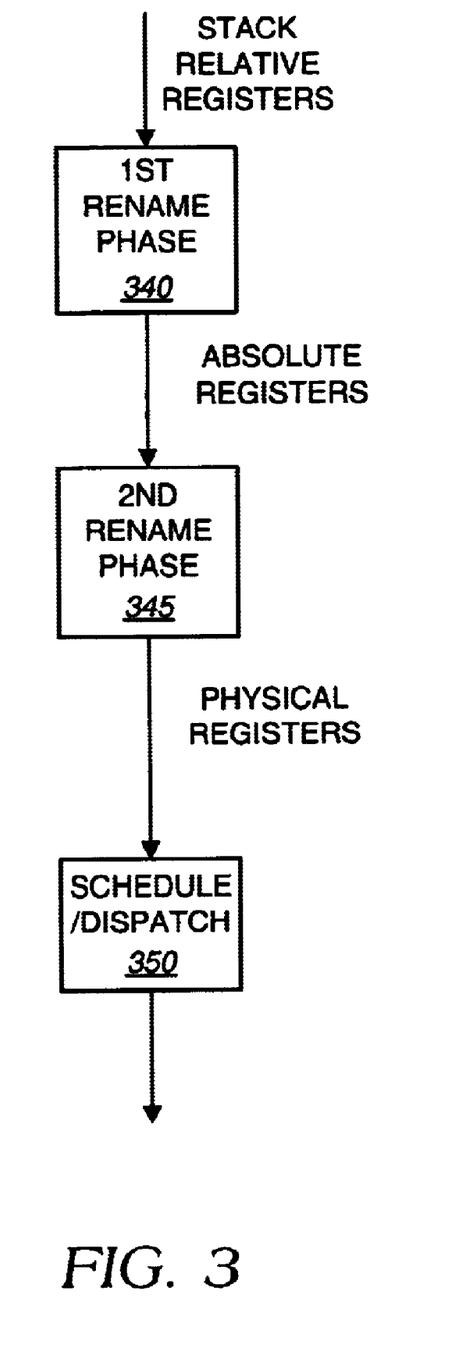
FIG. 3 shows a two-phase floating point register renamer.

FIG. 3 shows a block diagram of a floating point register rename stage in the processor pipeline described above. As explained above, register renaming for the floating point registers involves additional complexity because the floating point registers are architecturally accessed as a register stack. They are referenced by a top of stack (TOS) pointer and are therefore stack relative. In order to rename a reference to a logic floating point register into a reference to a physical floating point register, two rename phases are performed. At the first rename phase 340, the stack relative references are converted into absolute register references. At the second rename phase 345, the absolute register references are converted into physical register references. The instructions (UOPs) are then scheduled and dispatched for execution at the schedule/dispatch stage 350. As shown in FIG. 3, the current method of floating point register renaming performs the two rename phases sequentially which does not optimize the system performance as discussed above.

Figure 4:
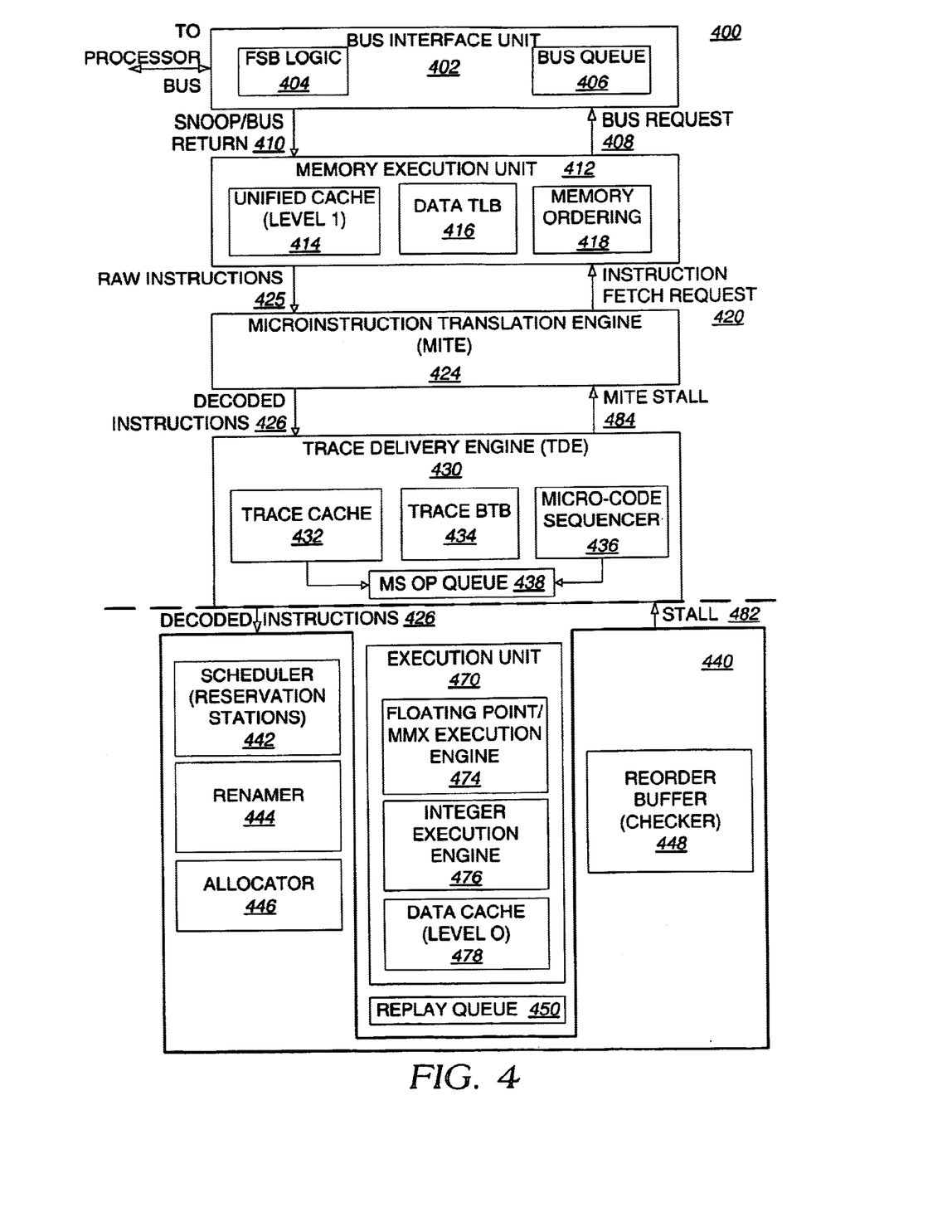
FIG. 4 shows a block diagram of one embodiment of a processor architecture in which the teachings of present invention are implemented.

FIG. 4 is a block diagram of one embodiment of a processor, in the form of a general-purpose microprocessor 400, in which the present invention may be implemented. The microprocessor 400 described below is a multithreaded (MT) processor and capable of processing multiple instruction threads simultaneously. However, the teachings of the present invention described below are fully applicable to other processors that process multiple instruction threads in an interleaved manner and also to single thread processors which have the capabilities to process multiple instructions either in parallel or in an interleaved manner. In one embodiment, the microprocessor 400 may be an Intel Architecture (IA) microprocessor that is capable of executing an Intel Architecture instruction set.

The microprocessor 400 comprises an in-order front end, an out-of-order execution core and an in-order retirement back end. The in-order front end includes a bus interface unit 402 which functions as an interface between the microprocessor 400 and other components (e.g., main memory unit) of a computer system within which the microprocessor 400 may be implemented. The bus interface unit 402 couples the microprocessor 400 to a processor bus (not shown) via which data and control information are transferred between the microprocessor 200 and other system components (not shown). The bus interface unit 400 includes a Front Side Bus (FSB) 404 that controls and facilitates communications over the processor bus. The bus interface unit 402 also includes a bus queue 406 that is used to provide a buffering function with respect to the communications over the processor bus. The bus interface unit 402 receives bus requests 408 from a memory execution unit 412. The bus interface unit 402 also sends snoops or bus returns to the memory execution unit 412.

The memory execution unit 412 (also referred to as the memory subsystem herein) is structured and configured to function as a local memory within the microprocessor 400. The memory execution unit 412 includes a unified data and instruction cache 414, a data Translation Lookaside Buffer (TLB) 416, and a memory ordering logic 418. The memory execution unit 412 receives instruction fetch requests 420 from a microinstruction translation engine (MITE) 424 and provides raw instructions 425 to the MITE 424. The MITE 424 decodes the raw instructions 425 received from the memory execution unit 412 into a corresponding set of microinstructions, also referred to as micro-operations or UOPs. Decoded microinstructions 426 are sent by the MITE 424 to a trace delivery engine (TDE) 430.

The trace delivery engine 430 functions as a microinstruction cache and is the primary source of microinstructions for a downstream execution unit 470. The trace delivery engine 430 includes a trace cache 432, a trace branch predictor (BTB) 434, a micro-code sequencer 436, and a micro-op (uop) queue 438. By having a microinstruction caching function within the processor pipeline, the trace delivery engine 430 and specifically the trace cache 432 can leverage the work done by the MITE 424 to provide a relatively high microinstruction bandwidth. In one embodiment, the trace cache 432 may comprise a 256 entry, 8 way set associate memory. The term "trace", in one embodiment, refers to a sequence of microinstructions stored within the entries of the trace cache 432 with each entry having pointers to preceding and proceeding microinstructions in the trace. Therefore, the trace cache 432 can facilitate high-performance sequencing in that the address of the next entry to be accessed to obtain a subsequent microinstruction is known before a current access is completed. The trace cache branch predictor 434 provides local branch predictions with respect to traces within the trace cache 432. The trace cache 432 and the microcode sequencer 436 provide microinstructions to the micro-op queue 438.

The microinstructions are then fed from the micro-op queue 438 to a cluster that includes a scheduler 442, a register renamer 444, an allocator 446, a reorder buffer 448 and a replay queue 450. The scheduler 442 includes a set of reservation stations and operates to schedule and dispatch microinstructions for execution to the execution unit 470. The register renamer 444 converts references to external registers into internal register references to remove dependencies caused by register reuse. The allocator 446 operates to allocate resources that are required for the execution of the microinstructions. In the event that the required resources are insufficient or unavailable to process a microinstruction or a set of microinstructions, the allocator 446 will assert a stall signal 482 that is propagated to the trace delivery engine 430 and the microinstruction translation engine 424. The replay queue 450 is used to store and provide those microinstructions that need to be re-executed (replayed) to the execution unit 470. The reorder buffer 448 is used to store the microinstructions in their original, sequential program order. When the microinstructions stored in the reorder buffer 448 have completed execution and are ready for retirement, they are removed from the reorder buffer in their original, sequential program order.

The execution unit 470 includes a floating point execution engine 474, an integer execution engine 476, and a level O data cache 478. In one embodiment in which the microprocessor 400 executes the IA instruction set, the floating point execution engine 274 may also execute MMX® instructions.

Figure 5:
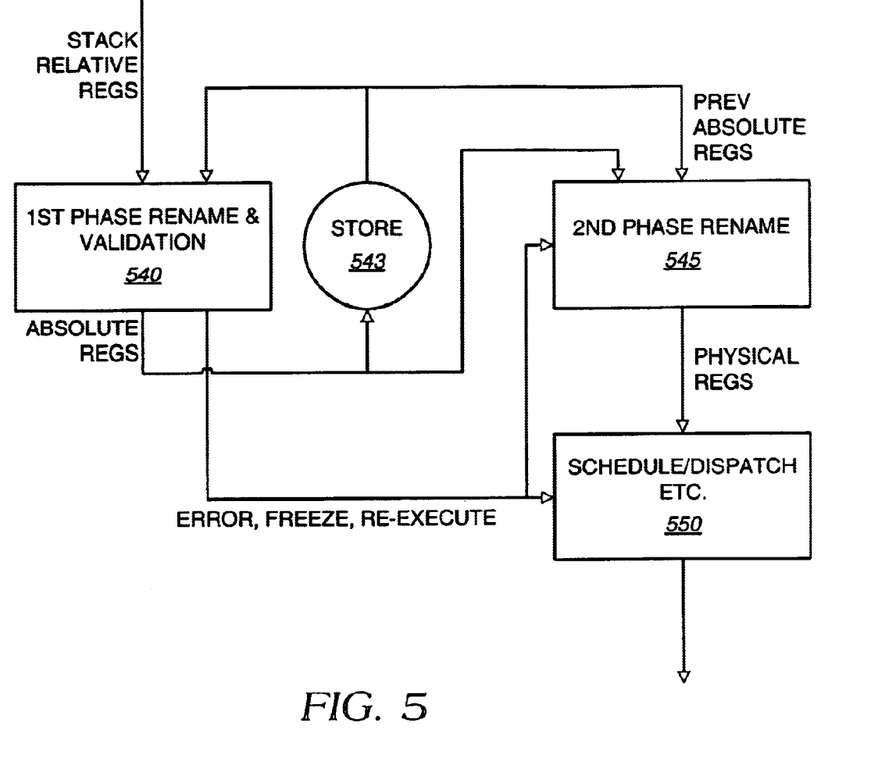
FIG. 5 shows a block diagram of one embodiment of a floating point register renamer according to the teachings of the present invention.

FIG. 5 illustrates a block diagram of one embodiment of a floating point register rename mechanism according to the teachings of the present invention. In one embodiment, the floating point register rename mechanism includes a first phase renamer 540, a storage structure 543, and a second phase renamer 545. In contrast to the conventional or traditional floating point register renaming mechanism which performs the two rename phases sequentially, the first phase renamer 540 and the second phase renamer 545 perform their corresponding functions in parallel according to the teachings of the present invention. As shown in FIG. 5, the first phase renamer converts references to logical floating point registers (i.e., stack relative references) into references to absolute registers. The results generated by the first renamer 540 are stored in the storage structure 543. In one embodiment, the storage structure is indexed via an instruction pointer. In addition, the results can be annotated along with the respective instruction within the processor instruction cache or the trace cache. Furthermore, the renaming results can be annotated along the decoded UOPs within a trace cache in the present embodiment. In parallel to the first phase renamer 540, the second phase renamer 545 speculatively converts the absolute register references into physical register references based on the results generated by the first phase renamer 540 and stored in the storage structure 543 with respect to the previous instance of the same instruction. In the present embodiment, the first phase renamer 540 also includes logic to validate the speculative operation performed by the second phase renamer 545. In one embodiment, the first phase renamer performs the validation by comparing the results generated by the first renamer 540 with respect to the current instance of the instruction with the results generated by the first renamer 540 with respect to the previous instance of the same instruction (the results with respect to the previous instance are stored in the storage structure 543). If the results do not match, then the speculative renaming operation performed by the second phase renamer 545 is incorrect. In this instance, the validation logic will generate a signal to the second phase renamer 545 to indicate that the speculative operation is incorrect. In response to this signal, the second phase renamer 545 repeats its corresponding function with respect to the current instance of the instruction using the results generated by the first renamer with respect to the current instance of the instruction. In one embodiment, when there is no record of previous instance of the instruction, a first instance processing case is performed. In one embodiment, a default or predetermined value can be supplied as the predicted value. If the default value is incorrect as determined by the validation logic as described above, the second phase renamer 545 will repeat its corresponding function using the results generated by the first renamer with respect to this instance of the instruction. Alternatively, a signal can be generated to indicate that there is no record of the previous instance of the instruction. In response to this signal, the second phase renamer 545 delays its operation until the first phase renamer 540 completes its renaming operation. In summary, the present invention speeds up the floating point register renaming by performing the second rename phase in parallel to the first rename phase using speculative values (i.e., results generated by the first rename phase with respect to the previous instance of the instruction). By performing the two phases in parallel, the processing pipeline is shortened by the time needed to perform the first rename phase. The results of the first phase renamer 540 for the previous instance of the same instruction are speculatively used by the second phase renamer 545 for the current instance of that instruction. The first phase renamer 540 performs its corresponding function in parallel to the second phase renamer 545 in order to validate the speculation. If the validation fails, as explained above, the second phase renaming is repeated by the second phase renamer 545 to generate the correct results. Theoretically, the mapping of a stack relative register to an absolute register may change from one instance of an instruction to another instance of the same instruction. In practice, however, the mapping is practically invariant due to the calling conventions, the register architecture (e.g., the IA32 ABI), and the conventions of compiler technology. Accordingly, all instances of a floating point instruction almost always use the same absolute registers.

Figure 6:
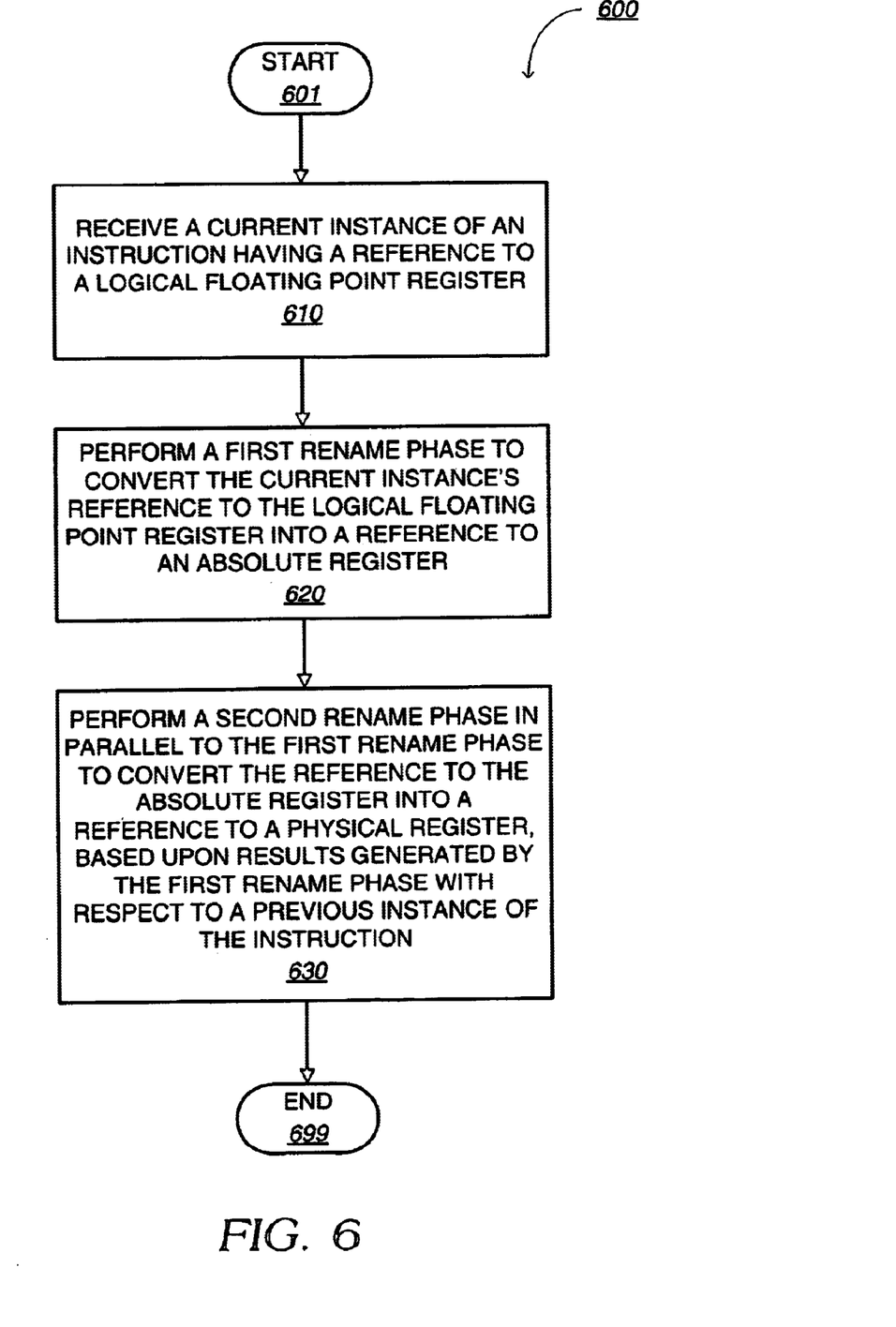
FIG. 6 illustrates a flow diagram of one embodiment of a method for fast, speculative floating point register renaming in accordance with the teachings of the present invention.

FIG. 6 shows a flow diagram of one embodiment of a method for performing speculative floating point register renaming. The method 600 starts at block 601 and proceeds to block 610. At block 610, a current instance of an instruction having a reference to a floating point register is received. At block 620, a first rename phase is performed to convert the current instance's reference to the logical floating pointer register into a reference to an absolute register. At block 630, a second rename phase is performed in parallel to the first rename phase to convert the reference to the absolute register into a reference to a physical register using the results generated by the first rename phase with respect to a previous instance of the same instruction. The method 600 proceeds to end at block 699.

Figure 7:
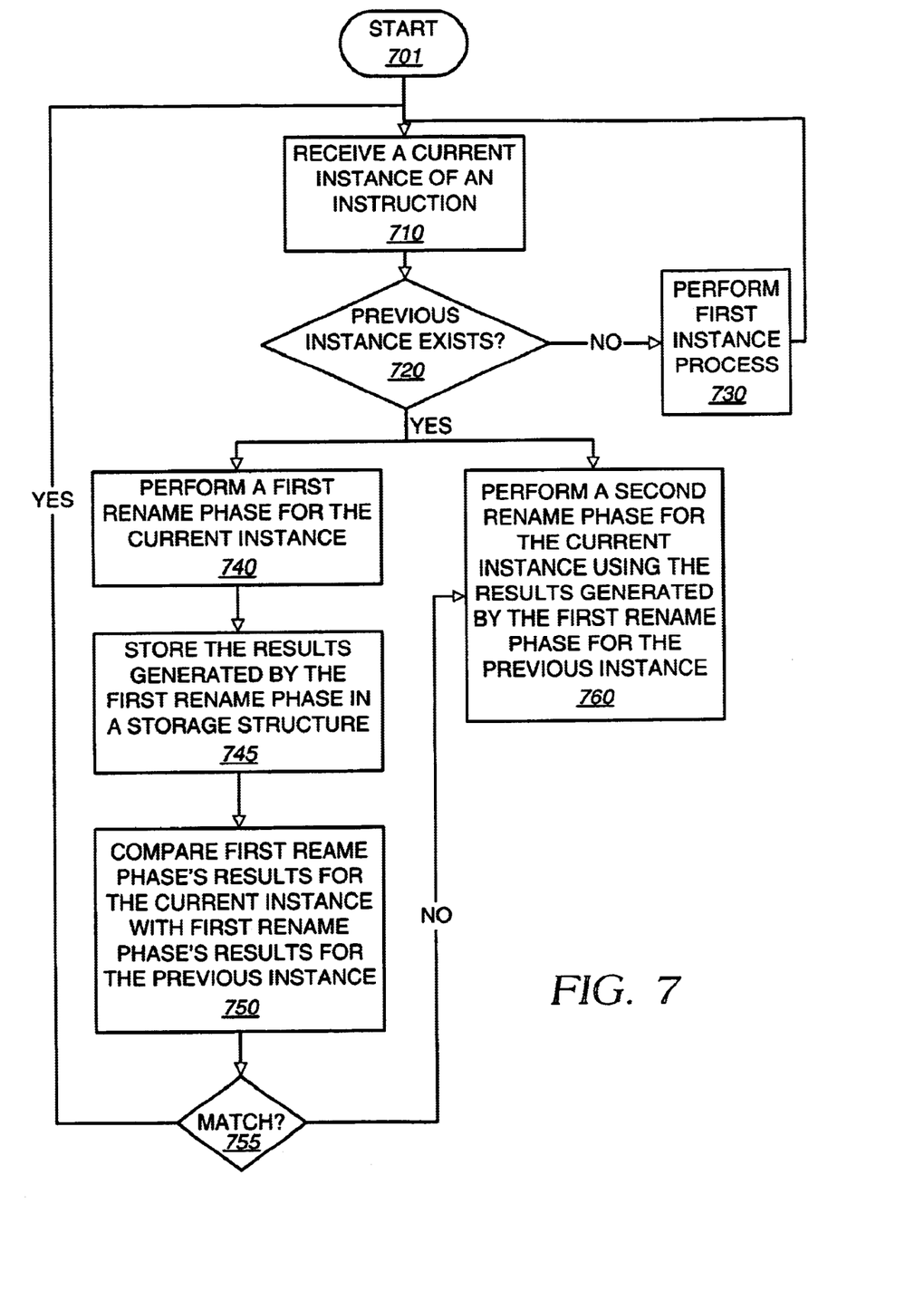
FIG. 7 shows a flow diagram of one embodiment of a method for performing floating point register renaming according to the teachings of the present invention.

FIG. 7 shows a more detailed flow diagram of one embodiment of a method for performing floating point register renaming. The method 700 starts at block 701 and proceeds to block 710. At block 710, a current instance of an instruction having a reference to a logical floating point register is received. At decision block 720, the method 700 proceeds to block 730 if there is no record of a previous instance of the instruction (i.e., the instruction is being processed for the first time). Otherwise the method 700 proceeds in parallel to blocks 740 and 760. At block 740, a first rename phase is performed to convert the current instance's reference to the logical floating point register is converted into a reference to an absolute register. At block 745, the results generated by the first rename phase for the current instance of the instruction are stored in a storage structure. In one embodiment, the storage structure can be indexed by an instruction pointer. At block 760, a second rename phase is performed for the current instance in parallel to the first rename phase to convert the current instance's reference to the absolute register into a reference to a physical register, based on the results generated by the first rename phase with respect to the previous instance of the instruction. At block 750, the first rename phase's results for the current instance are compared with the first rename phase's results for the previous instance to validate the speculative operation performed by the second rename phase. At decision block 755, if the results do not match then the method 700 proceeds to block 760 to repeat the second rename phase using the results generated by the first rename phase for the current instance. Otherwise the method 700 loops back to block 710.

The invention has been described in conjunction with the preferred embodiment. It is evident that numerous alternatives, modifications, variations and uses will be apparent to those skilled in the art in light of the foregoing description.

What is claimed is:

1. A method comprising:
   receiving a current instance of an instruction having a reference to a logical floating point register;
   performing a first rename phase to convert the current instance's reference to the logical floating point register into a reference to an absolute register; and
   performing, in parallel to the first rename phase, a second rename phase to convert the reference to the absolute register into a reference to a physical register, based upon results obtained from performing the first rename phase with respect to a previous instance of the instruction.

2. The method of claim 1 further comprising:
   storing results of the first rename phase with respect to the previous instance of the instruction in a data structure.

3. The method of claim 2 wherein the data structure is indexed via an instruction pointer.

4. The method of claim 1 further comprising:
   determining whether the results obtained from performing the first rename phase with respect to the current instance of the instruction match the results obtained from performing the first rename phase with respect to the previous instance of the instruction; and
   if the results obtained with respect to the current instance of the instruction do not match the results obtained with respect to the previous instance of the instruction then repeating the second rename phase with respect to the current instance of the instruction.

5. The method of claim 4 wherein repeating the second rename phase comprises:
   performing the second rename phase with respect to the current instance of the instruction using the results obtained from performing the first rename phase with respect to the current instance of the instruction.

6. The method of claim 1 further comprising:
   storing the results obtained from performing the first rename phase with respect to the current instance of the instruction; and
   using the results stored in performing the second rename phase with respect to a subsequent instance of the instruction.

7. The method of claim 1 further comprising:
   determining whether there exists a previous instance of the instruction; and
   if the previous instance does not exist, performing a first instance processing option.

8. The method of claim 7 wherein performing the first instance processing option comprises:
   providing a predetermined value as the results of the first rename phase with respect to the previous instance of the instruction.

9. The method of claim 7 wherein performing the first instance processing option comprises:
   activating a first signal indicating that the previous instance of the instruction does not exist; and
   in response to the first signal being activated, delaying the second rename phase with respect to the current instance until the first rename phase with respect to the current instance is completed.

10. An apparatus comprising:
   a first phase renamer to convert a reference to a logical floating point register in a current instance of an instruction into a reference to an absolute register; and
   a second phase renamer to convert, in parallel to the first renamer, the reference to the absolute register into a reference to a physical register, based upon results generated by the first phase renamer with respect to a previous instance of the instruction.

11. The apparatus of claim 10 further comprising:
   a storage structure to store the results generated by the first renamer with respect to the previous instance of the instruction.

12. The apparatus of claim 11 wherein the storage structure is indexed via an instruction pointer.

13. The apparatus of claim 10 further comprising:
   logic to validate whether the results generated by the first renamer with respect to the current instance of the instruction match the results generated by the first renamer with respect to the previous instance of the instruction.

14. The apparatus of claim 13 wherein:
   the second renamer repeats the conversion with respect to the current instance of the instruction if the results generated by the first renamer with respect to the current instance of the instruction do not match the results generated by the first renamer with respect to the previous instance of the instruction.

15. The apparatus of claim 14 wherein the second renamer repeats the conversion with respect to the current instance of the instruction using the results generated by the first renamer with respect to the current instance of the instruction.

16. The apparatus of claim 10 wherein the storage structure is used to store the results generated by the first renamer with respect to the current instance of the instruction, the results stored to be used by the second renamer in performing its corresponding function with respect to a subsequent instance of the instruction.

17. The apparatus of claim 10 further comprising:
   logic to determine whether there exists a previous instance of the instruction; and
   logic to perform a first instance processing if the previous instance does not exist.

18. The apparatus of claim 17 wherein the logic to perform the first instance processing comprises:
   logic to provide a predetermined value as the results generated by the first renamer with respect to the previous instance of the instruction.

19. The apparatus of claim 17 wherein the logic to perform the first instance processing comprises:
   logic to activate a first signal indicating that the previous instance of the instruction does not exist; and
   in response to the first signal being activated, logic to delay the operation of the second renamer with respect to the current instance until the first renamer completes its corresponding operation.

20. A processor comprising:
   a floating point register renamer comprising:
      a first phase renamer to convert a reference to a logical floating point register in a current instance of an instruction into a reference to an absolute register; and
      a second renamer to convert, in parallel to the first renamer, the reference to the absolute register into a reference to a physical register, based upon results generated by the first phase renamer with respect to a previous instance of the instruction.

21. The processor of claim 20 further comprising:
   a storage structure to store the results generated by the first renamer with respect to the previous instance of the instruction.

22. The processor of claim 20 further comprising:
   logic to validate whether the results generated by the first renamer with respect to the current instance of the instruction match the results generated by the first renamer with respect to the previous instance of the instruction.

23. The processor of claim 22 wherein:
   the second renamer repeats its corresponding operation with respect to the current instance of the instruction if the results generated by the first renamer with respect to the current instance of the instruction do not match the results generated by the first renamer with respect to the previous instance of the instruction.

24. The processor of claim 23 wherein the second renamer repeats its corresponding operation with respect to the current instance of the instruction using the results generated by the first renamer with respect to the current instance of the instruction.

* * * * *

UNITED STATES PATENT AND TRADEMARK OFFICE
CERTIFICATE OF CORRECTION

PATENT NO. : 6,697,933 B1  Page 1 of 1
DATED : February 24, 2004
INVENTOR(S) : Pribush et al.

It is certified that error appears in the above-identified patent and that said Letters Patent is hereby corrected as shown below:

Column 1,
Lines 36 and 57, delete "modem", insert -- modern --.

Column 6,
Line 12, delete "O", insert -- 0 --.

Signed and Sealed this

Eighteenth Day of May, 2004

JON W. DUDAS
*Acting Director of the United States Patent and Trademark Office*